W. B. HUTHER.
METAL CUTTING SAW.
APPLICATION FILED FEB. 1, 1913.
1,125,102.
Patented Jan. 19, 1915.
2 SHEETS—SHEET 2.
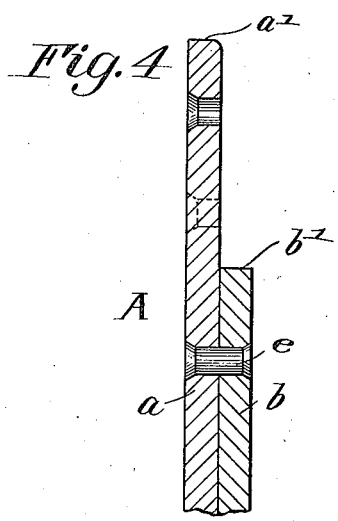
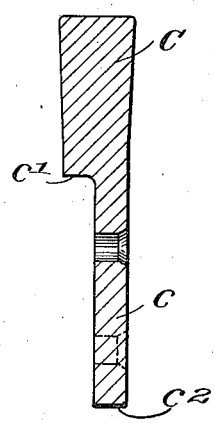
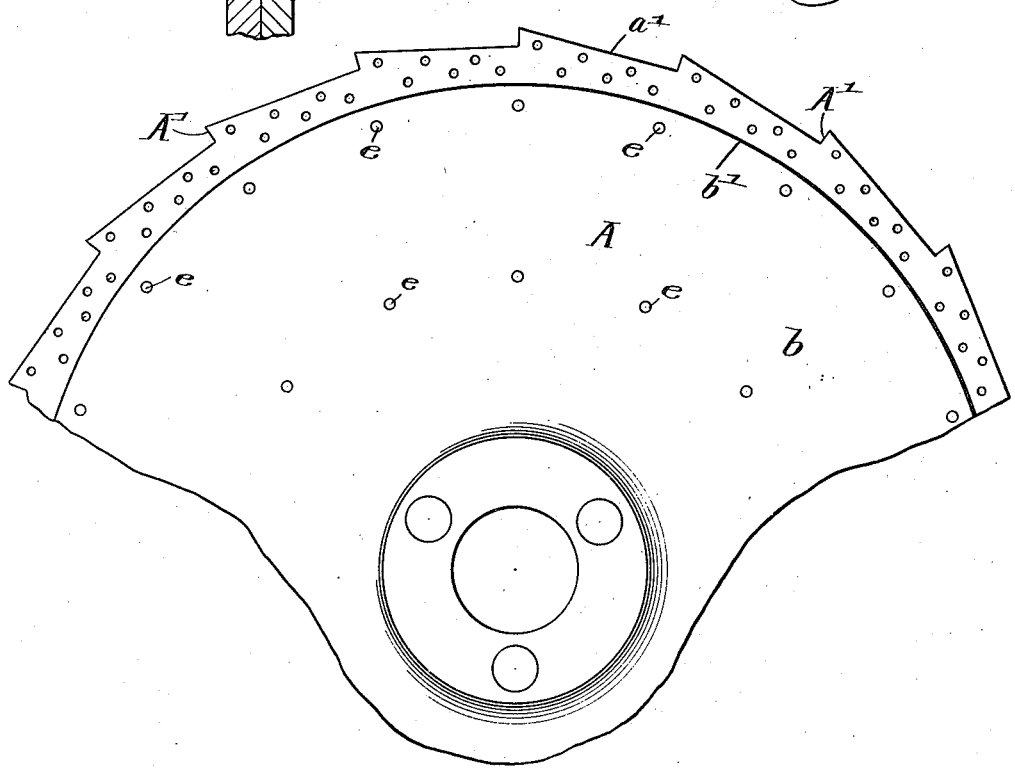
Witnesses
Nelson H. Copp
Raymond J. Schlegel
Inventor
Warren B. Huther
By Church & Rich
his Attorneys

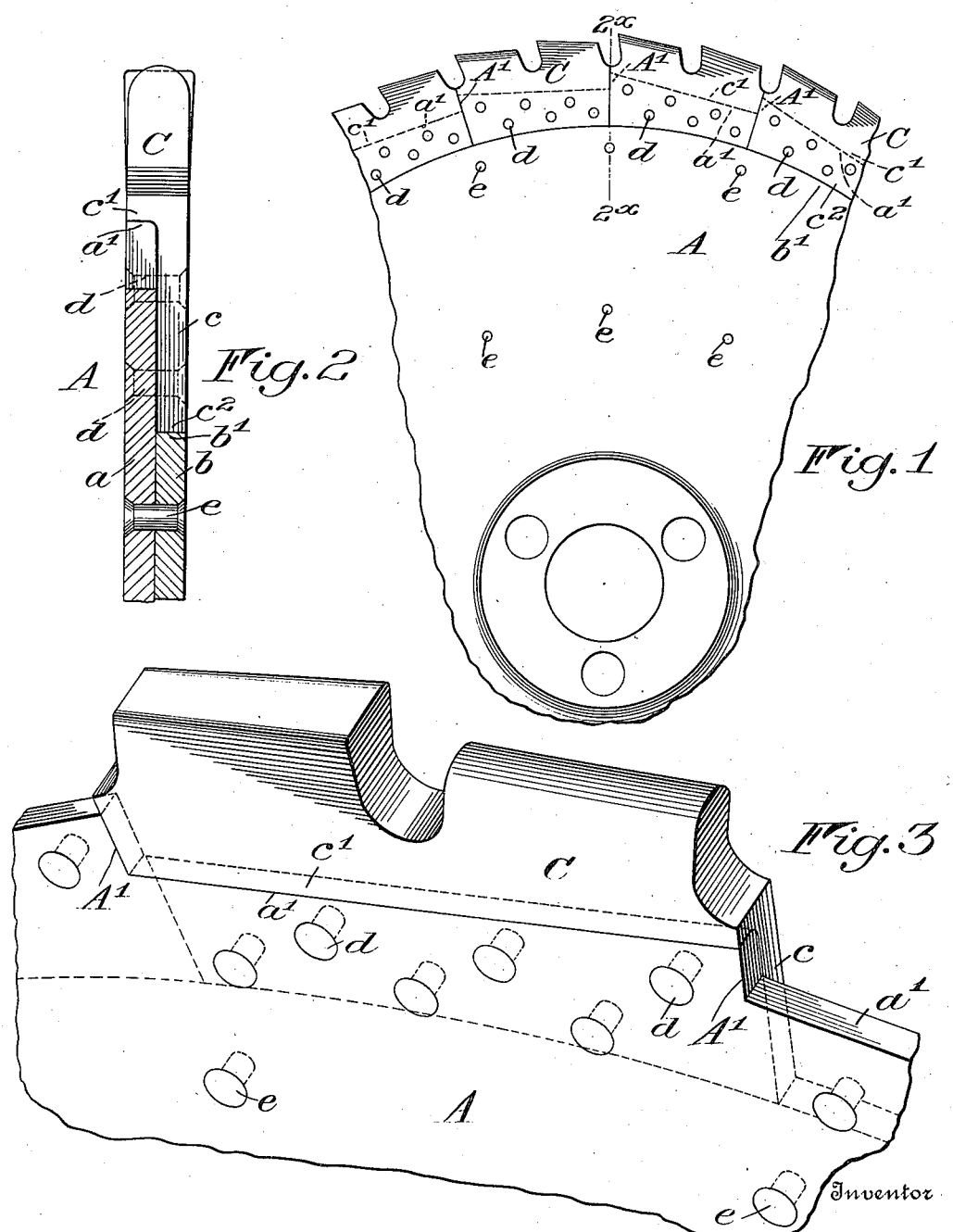

UNITED STATES PATENT OFFICE.

WARREN B. HUTHER, OF ROCHESTER, NEW YORK, ASSIGNOR TO HUTHER BROS. SAW MANUFACTURING COMPANY, OF ROCHESTER, NEW YORK.

METAL-CUTTING SAW.

1,125,102.  Specification of Letters Patent.  Patented Jan. 19, 1915.

Application filed February 1, 1913. Serial No. 745,543.

*To all whom it may concern:*

Be it known that I, WARREN B. HUTHER, of Rochester, in the county of Monroe and State of New York, have invented certain new and useful Improvements in Metal-Cutting Saws; and I do hereby declare the following to be a full, clear, and exact description of the same, reference being had to the accompanying drawings, forming a part of this specification, and to the reference-numerals marked thereon.

My present invention has for its object to provide certain improvements in saws and it relates more particularly to the manufacture of saws for cutting metal, the improvements incorporated therein adapting such saws to be made of sizes of larger diameter than has heretofore been deemed feasible, and it provides a novel means of mounting the teeth whereby these may be made replaceable and when mounted on the saw plate, are firmly seated, the engaging portions between the parts receiving the thrust and sustaining the major portion of the working strain instead of depending upon the rivets for holding the parts in engagement.

To these and other ends the invention consists in certain improvements and combinations of parts all of which will be more fully described hereinafter, the novel features being pointed out in the claims at the end of the specification.

In the drawings: Figure 1 is a fragmentary view of a portion of a circular saw constructed in accordance with my invention; Fig. 2 is a cross sectional view on the line $2^x$—$2^x$ of Fig. 1; Fig. 3 is an enlarged perspective view showing one of the plates; Figs. 4 and 5 are detail cross sectional views, showing respectively the edge of the body plate and a saw tooth detached. Fig. 6 is a face view of a saw body composed of two plates of different diameters arranged concentrically.

Similar reference numerals in the several figures indicate the same parts.

My invention comprehends the construction of a saw, preferably a circular saw, comprising a body plate, possessing the necessary rigidity and selected from stock of tough characteristics and separate teeth mounted thereon, composed of metal the molecular composition of which is adapted particularly for the character of work the saw is intended to perform.

My invention further comprehends certain features relating to the manner of attaching the teeth to the body plate whereby each tooth is securely backed by the plate during the cutting operation, the strain thus imparted to the teeth being borne directly by the plate, rather than by the securing devices or rivets by means of which the parts are connected.

In carrying out my invention, I apply to a saw plate or body, a plurality of separate teeth which are provided at one side with an attaching portion which is accommodated in a groove or recess formed at the edge of one of the faces of the saw plate, the cutting edge of the tooth being equal to the thickness of the saw body or plate, or slightly in excess thereof, to provide the necessary clearance so that during the cutting operation or when operating upon stock of considerable thickness, the plate may follow into the kerf or channel cleared out by the teeth.

The invention, it will be appreciated, is equally applicable to a saw in which the teeth are arranged in a straight line, but as I do not deem this type of a saw adapted for extensive metal cutting operations, I have illustrated my invention as applied particularly to circular saws.

In the drawings a portion of the body of a circular saw is shown and indicated by A. It may be constructed of a single plate in which the peripheral groove or recess is formed by the necessary machine operations, as will be understood, or, the saw body may be composed of two plates $a$ and $b$, of different diameters. When two plates are employed, these are arranged concentrically so that their peripheral edges or rims $a'$ and $b'$ will constitute offset shoulders, the distance between said shoulders representing the annular peripheral recess provided in the saw body to accommodate the attaching portions of the saw teeth.

In forming the offset shoulders I make the outer one into a plurality of steps, or like ratchet teeth, the number of which about the periphery of the plate corresponds to the number of teeth applied thereto, so that each of said replaceable teeth plates will have a corresponding radial shoulder A', which receives the working thrust imparted to the tooth during the cutting action. In forming these notches in the periphery of the saw body, I prefer to make the rim portion or bearing surface, which is indicated by $a'$, along straight lines extending from the bottom of one ratchet tooth or shoulder A' to the joint of the next adjacent shoulder, and to similarly form the engaging shoulders on the teeth plates, as this greatly simplifies the machine operations necessary to form these parts, resulting in a corresponding reduction of cost.

The working point of the saw plate may be shaped in any desired manner, having due regard for the particular work to be performed, and these teeth are formed either singly or in plural arrangement upon the tooth plates, each of which comprises a working or cutting portion C which is at least equal to the thickness of the saw plate body, or as previously mentioned, slightly in excess of this thickness, and the offset attaching portion $c$ of the plate is in thickness and breadth equal to the corresponding dimensions of the recess of the saw plate in which it is received. In constructing the saw tooth members, it will be observed that the reduced portion $c$ provides these parts with offset shoulders or seats indicated by $c'$ and $c^2$ in Fig. 2, corresponding to the shoulders $a'$ and $b'$ on the saw body and with which they engage when properly positioned thereon. In the construction of these parts, I deem it essential that they should be made with considerable accuracy so that intimate contact is obtained between both the outer and the inner shoulders of the respective parts, because when so constructed, the major portion of the strain imparted to a tooth will be borne by said shoulders and any displacement which might occur by a tendency of the tooth to twist or rock, is obviated, while the tendency of the teeth to move in a direction at right angles to radial lines of the saw is prevented by the shoulders A'. The teeth are held in place by a plurality of rivets $d$ and when the body is composed of two plates, these are connected by rivets $e$.

In a saw constructed in accordance with my invention, the working strain is for the most part resisted by the stop shoulders A' and the offset shoulders $a'$ and $b'$ on the saw plate body, so that only a nominal portion of the load is resisted by the rivets $d$. The arrangement of the stop shoulders so as to carry the major portion of the working load of the teeth permits rivets of smaller diameter to be used than could otherwise be employed and rivets which are made of softer stock, which facilitates their being drilled out in the event it becomes necessary to replace a tooth. An advantage is also found in the form of parts which I have adopted, since the teeth being all secured to one side of the saw body, greatly simplifies the construction of the latter as the peripheral recess is an annular one and all the machine operations necessary in forming it are performed upon one side of the plate. Further, the body plate of the saw may be made of a carbon steel, having the combined qualities of toughness and rigidity thus reducing its liability to become fractured under heavy duty while the teeth may be made of high speed steel or other metal adapted peculiarly for the work it is intended they should do.

I claim as my invention:

1. In a saw, the combination with a body plate having a plurality of radially extending shoulders and bearing surfaces extending from the bottom of one shoulder to the top of the adjacent shoulder, of saw tooth members riveted to the side of the body plate having portions extending over the edge of the plate and engaging the shoulders thereon.

2. In a saw, the combination with a body plate having a circumferential recess provided in one face and having its outer edge shaped into ratchet teeth formation, of saw tooth members each having an attaching portion fitting said recess and a cutting portion overhanging the edge of the plate and fitting one of the ratchet teeth thereon.

WARREN B. HUTHER.

Witnesses:
G. WILLARD RICH,
RUSSELL B. GRIFFITH.